US012730355B2

(12) United States Patent
Chen et al.

(10) Patent No.: US 12,730,355 B2
(45) Date of Patent: Sep. 8, 2026

(54) OPTICAL ELEMENT DRIVING MECHANISM

(71) Applicant: Actutek Corporation, Taoyuan City (TW)

(72) Inventors: Yung-Yun Chen, Taoyuan City (TW); Jui-Che Meng, Taoyuan City (TW); Tso-Hsiang Wu, Taoyuan City (TW); Ko-Lun Chao, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 328 days.

(21) Appl. No.: 18/413,430

(22) Filed: Jan. 16, 2024

(65) Prior Publication Data

US 2024/0241337 A1 Jul. 18, 2024

Related U.S. Application Data

(60) Provisional application No. 63/439,409, filed on Jan. 17, 2023.

(51) Int. Cl.
*G03B 5/00* (2021.01)
*G02B 7/02* (2021.01)

(52) U.S. Cl.
CPC ................ *G03B 5/00* (2013.01); *G02B 7/02* (2013.01); *G03B 2205/0069* (2013.01)

(58) Field of Classification Search
CPC .... G03B 5/00; G03B 2205/0069; G03B 3/10; G03B 13/36; G03B 30/00; G02B 7/02; G02B 7/08; G02B 7/09; G02B 7/10; G02B 7/1805; G02B 26/004
See application file for complete search history.

(56) References Cited

U.S. PATENT DOCUMENTS

2021/0149143 A1* 5/2021 Hu ........................... G02B 7/08
2022/0121025 A1* 4/2022 Wang ....................... G02B 7/04

* cited by examiner

*Primary Examiner* — Tuyen Tra
(74) *Attorney, Agent, or Firm* — MUNCY, GEISSLER, OLDS & LOWE, P.C.

(57) ABSTRACT

An optical element driving mechanism is provided, and includes a movable portion, a fixed portion, and a driving assembly. The movable portion is used to connect an optical element and is movable relative to the fixed portion. The driving assembly is used to drive the movable portion to move relative to the fixed portion in a first axis. The driving assembly is arranged along a second axis, and the second axis is perpendicular to the first axis.

17 Claims, 12 Drawing Sheets

OPTICAL ELEMENT DRIVING MECHANISM

CROSS REFERENCE TO RELATED APPLICATIONS

This application claims the benefit of U.S. Provisional Application No. 63/439,409, filed Jan. 17, 2023, the entirety of which is incorporated by reference herein.

BACKGROUND OF THE INVENTION

Field of the Invention

The present disclosure relates to an optical element driving mechanism, and in particular to an optical element driving mechanism including a guiding assembly for moving the movable portion relative to the fixed portion.

Description of the Related Art

With the development of technology, the application of electronic devices has become more and more popular. In particular, electronic devices with camera or video functions, such as mobile phones and laptops, have gradually become an indispensable part of daily life. Currently, these electronic devices are usually equipped with multi-lens modules to achieve higher quality photography functions. However, in terms of manufacturing cost and functionality, there is still room for improvement in existing multi-lens modules.

BRIEF SUMMARY OF THE INVENTION

An embodiment of the present invention provides an optical element driving mechanism, which includes a movable portion, a fixed portion, and a driving assembly. The movable portion is used to connect an optical element and is movable relative to the fixed portion. The driving assembly is used to drive the movable portion to move relative to the fixed portion in a first axis. The driving assembly is arranged along a second axis, and the second axis is perpendicular to the first axis.

In some embodiments, the optical element driving mechanism further includes a guiding assembly, wherein the movable portion is movable along the first axis relative to the fixed portion via the guiding assembly, and the guiding assembly includes a first guiding assembly and a second guiding assembly. The second guiding assembly is in contact with and movable relative to the first guiding assembly. The first contact surface of the first guiding assembly contacts the second contact surface of the second guiding assembly. In some embodiments, the second guiding assembly further includes a first positioning portion having a first positioning surface. The first positioning surface faces the first guiding assembly, and an angle formed between the first positioning surface and the second contact surface is between 15 degrees and 60 degrees.

In some embodiments, the second guiding assembly further includes a second positioning portion having a second positioning surface. The second positioning surface faces the first guiding assembly, the second positioning surface is not parallel and not perpendicular to the first positioning surface. In some embodiments, the second positioning surface is not parallel and not perpendicular to the second contact surface. In some embodiments, the angle between the first positioning surface and the second contact surface is different from an angle between the second positioning surface and the second contact surface, and the angle between the first positioning surface and the second contact surface is greater than the angle between the second positioning surface and the second contact surface.

In some embodiments, the optical element driving mechanism further includes a linkage assembly. When the movable portion moves relative to the fixed portion, the optical element is driven to move via the linkage assembly, and the optical element is movable relative to the movable portion. In some embodiments, the linkage assembly includes a linkage element and an opening structure. The linkage element has a protruding structure. The opening structure corresponds to the linkage element. In some embodiments, the linkage assembly and the sidewall of the fixed portion overlap in the second axis.

In some embodiments, the driving assembly includes a magnetic element and a coil corresponding to the magnetic element. The magnetic element is disposed on either of the movable portion and the fixed portion, and the coil is disposed on the other of the movable portion and the fixed portion. In some embodiments, the driving assembly further includes a magnetically permeable element used to generate a magnetic attraction force with the magnetic element, and the coil surrounds the magnetically permeable element. In some embodiments, the magnetically permeable element is exposed from a bottom surface of the fixed portion, and a top surface of the fixed portion covers the magnetically permeable element. In some embodiments, when the fixed portion includes a base, the base has a first groove and a second groove separated from each other, the coil is disposed in the first groove, and the magnetic element is disposed in the second groove. In some embodiments, the optical element driving mechanism further includes a guiding assembly. The movable portion is movable in the first axis relative to the fixed portion via the guiding assembly, and the guiding assembly is located between the first groove and the second groove.

In some embodiments, the optical element driving mechanism further includes a circuit assembly electrically connected to the driving assembly. The circuit assembly includes a first contact and a second contact, and the first contact and the second contact are respectively located on opposite sides of a coil of the driving assembly. In some embodiments, the circuit assembly includes a plurality of segments embedded in the fixed portion, and the segments extend in different directions. In some embodiments, the segments include a first segment adjacent to the first contact and a second segment adjacent to the second contact, and in a third axis perpendicular to the first axis and the second axis, a length of the second section is greater than a length of the first section.

In some embodiments, the fixed portion comprises an outer frame, the outer frame has a top surface and a sidewall extending from the top surface, and the sidewall is not parallel to the top surface. In some embodiments, the angle between the sidewall and the top surface is less than 90 degrees. In some embodiments, the fixed portion includes a base, and the base has a receiving groove corresponding to the profile of the sidewall of the outer frame.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The optical element driving mechanisms of some embodiments of the present disclosure are described in the following description. However, it should be appreciated that the following detailed description of some embodiments of the disclosure provides various concepts of the present disclosure which may be performed in specific backgrounds that may vary widely. The specific embodiments disclosed are provided merely to clearly describe the usage of the present disclosure by some specific methods without limiting the scope of the present disclosure.

In addition, relative terms such as “lower” or “bottom,” “upper” or “top” may be used in the following embodiments in order to describe the relationship between one element and another element in the figures. It should be appreciated that if the device shown in the figures is flipped upside-down, the element located on the “lower” side may become the element located on the “upper” side. It should be noted that the first axis A1, the second axis A2 and the third axis A3 that are perpendicular to each other are defined in the present disclosure. These axial directions are for convenience of illustration only and are not intended to limit actual directions.

It should be understood that although the terms “first,” “second,” etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure. Unless defined otherwise, the first or second element, material and/or portion in the claims may be interpreted as any element, material and/or portion in the specification as long as it conforms to the description in the claims.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms “substantially,” “approximately” or “about” may also be recited in the present disclosure, and these terms are intended to encompass situations or ranges that is substantially or exactly the same as the description herein. It should be noted that unless defined specifically, even if the above terms are not recited in the description, it should be read as the same meaning as those approximate terms are recited.

Figure 1:
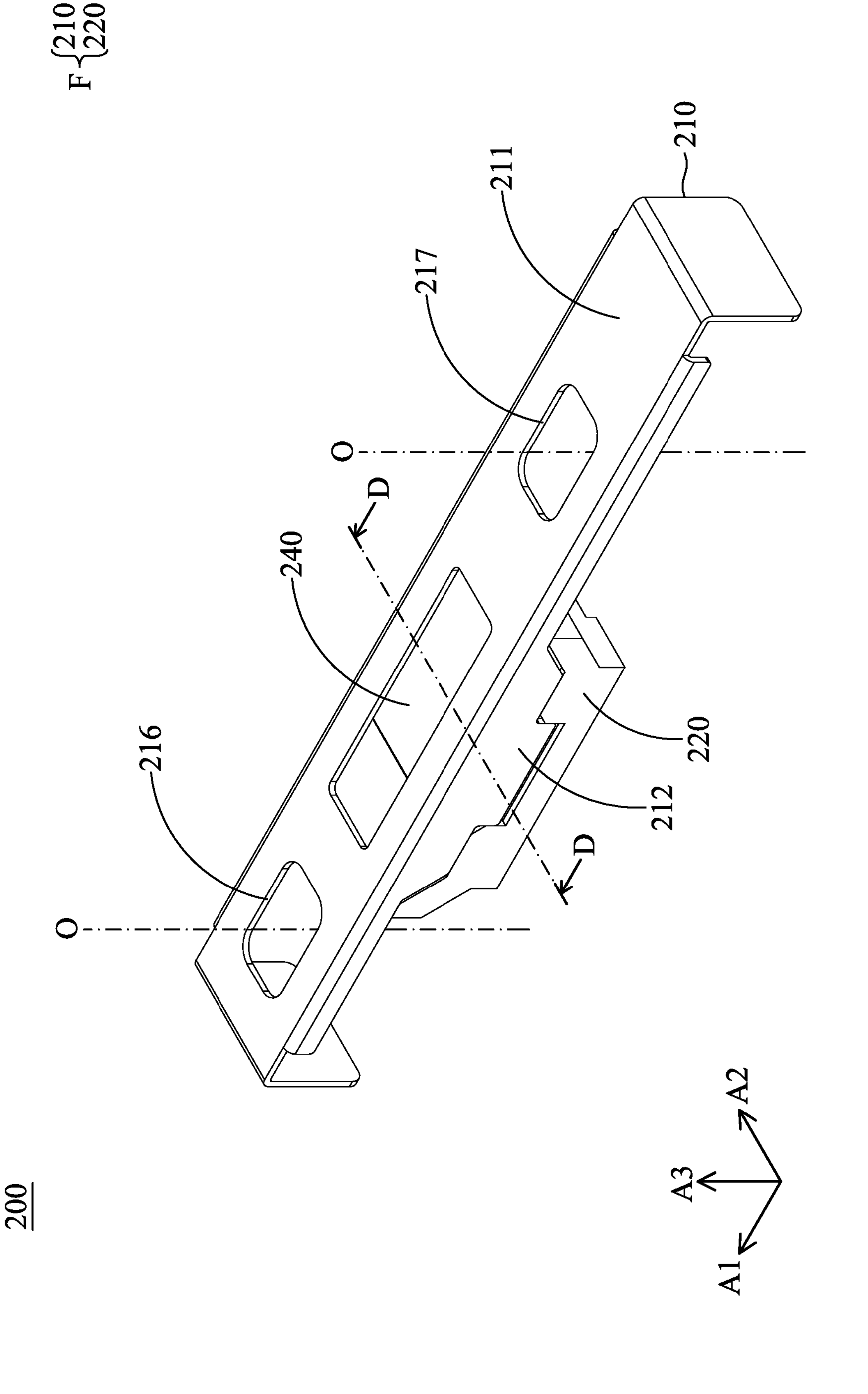
FIG. 1 shows a perspective view illustrating the optical element driving mechanism in accordance with some embodiment of the present disclosure.

FIG. 1 shows a perspective view illustrating the optical element driving mechanism 200 in accordance with some embodiment of the present disclosure. It should be noted that the optical element driving mechanism 200 can be disposed in any suitable electronic device, such as mobile phones, laptops, etc., but the present disclosure is not limited thereto. In some embodiments, the present disclosure merely illustrates a part of the optical element driving mechanism 200, and any optical element driving mechanism that may include this part is included within the scope of the present disclosure. As shown in FIG. 1, the optical element driving mechanism 200 includes a fixed portion F, a movable portion 230 and a driving assembly 260 (referring to FIG. 2). In some embodiments, the fixed portion F may include an outer frame 210 and a base 220. The movable portion 230 is used to connect an optical element 240, and the movable portion 230 is movable relative to the fixed portion F.

In some embodiments, the outer frame 210 may include a top surface 211 and sidewalls 212 extending from the top surface 211. For example, the normal direction of the top surface 211 may be substantially parallel to the third axis A3, and the sidewalls 112 may extend toward the base 120 and along the third axis A3. In some embodiments, the top surface 211 has a first optical opening 216 and a second optical opening 217, respectively corresponding to different optical modules (not shown). The driving assembly 260 may be used to drive the movable portion 230 (and the optical element 240 which is connected to the movable portion 230) to move relative to the fixed portion F along the first axis A1. By driving the movable portion 230 and the optical element 240 to move relative to the fixed portion F along the first axis A1 via the driving assembly 260, the optical element 240 may also move to the light-transmitting position (as shown in FIG. 1) to expose the first optical opening 216 and the second optical opening 217 (that is, the optical element 240 does not overlap with the first optical opening 216 and the second optical opening 217), so that light may pass through the first optical opening 216 and the second optical opening 217 along the optical axis O (for example, parallel to the third axis A3) and enter the above optical modules (not shown). In addition, the optical element 240 may move to the light-shielding position and completely overlap the first optical opening 116 and the second optical opening 117. In this way, the optical element 140 may block the light and prevent the light from entering the optical modules along the optical axis O.

Figure 2:
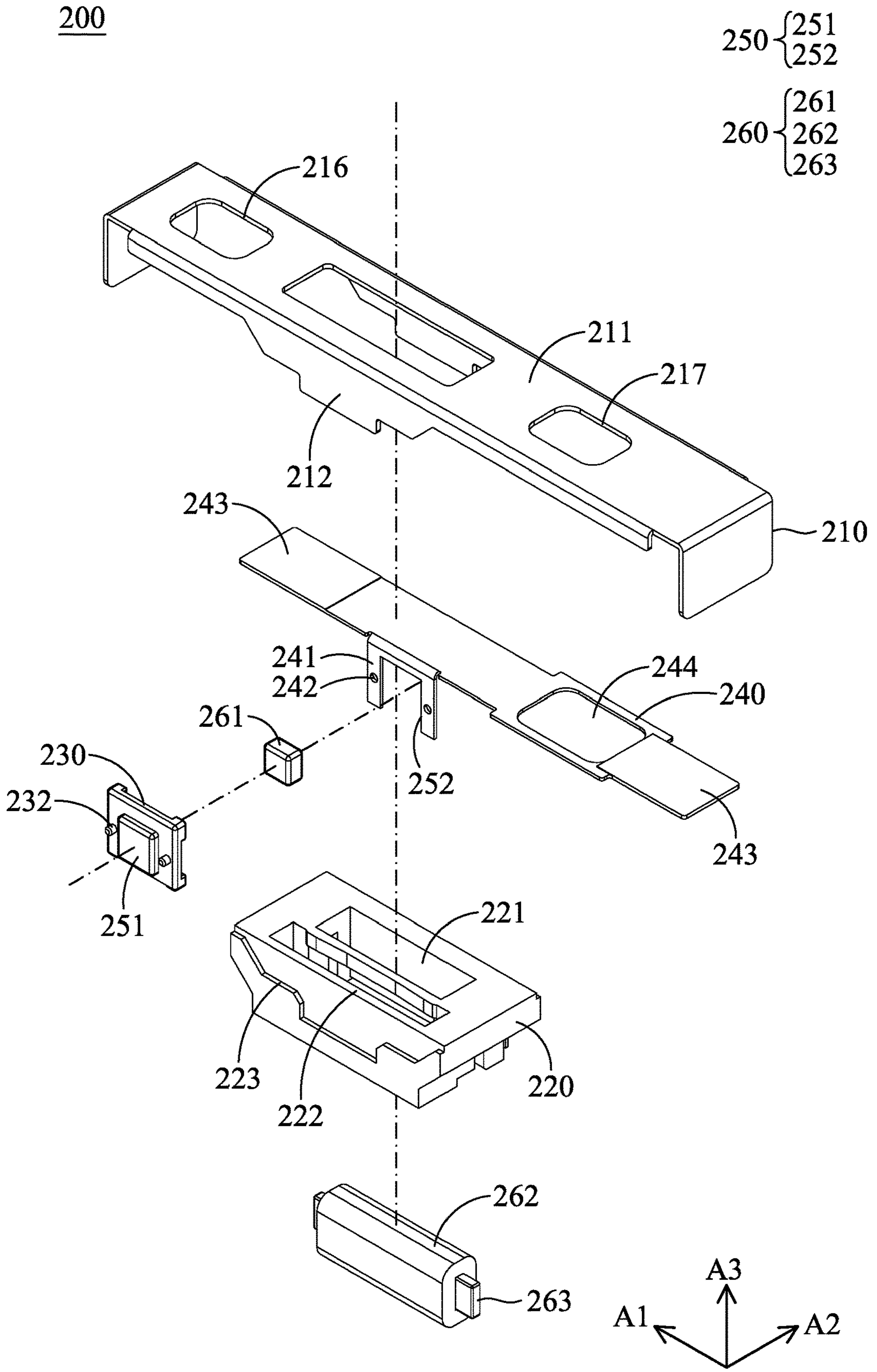
FIG. 2 shows an exploded view illustrating the optical element driving mechanism in accordance with some embodiment of the present disclosure.

FIG. 2 shows an exploded view illustrating the optical element driving mechanism 200 in accordance with some embodiments of the present disclosure. As shown in FIG. 2, the movable portion 230 and the optical element 240 are disposed in the space between the outer frame 210 and the base 220. Specifically, the movable portion 230 is disposed on the base 220, and the optical element 240 is connected to the movable portion 230 and located between the outer frame 210 and the movable portion 230. In some embodiments, the optical element 240 includes light-shielding portions 243 and a light-transmitting portion 244. For example, the light shielding portions 243 may correspond to the first optical opening 216 and the second optical opening 217. Specifically, the optical element 240 can be moved to a first position (for example, the light-shielding position), so that the light-shielding portions 243 block the first optical opening 216 and the second optical opening 217. In some embodiments, on a horizontal plane (the normal direction of which is parallel to the third axis A3, for example), the size of the light-shielding portions 243 may be larger than the size of the first optical opening 216 and/or the second optical opening 217. In some embodiments, the shape of the light-shielding portions 243 may be different from the shape of the first optical opening 216 and/or the second optical opening 217. However, the present disclosure is not limited thereto. It should be understood that any light-shielding portions 243 that can block the first optical opening 216 and the second optical opening 217 is included within the scope of the present disclosure.

In addition, the light-transmitting portion 244 may be an opening structure corresponding to the first optical opening 216 and the second optical opening 217. In some embodiments, the light-transmitting portion 244 may be located between the light-shielding portions 243. Specifically, the optical element 240 can be moved to a second position (for example, the light-transmitting position), so that the light-transmitting portion 244 is located below the second optical opening 217 and the first optical opening 216 is misaligned with the optical element 240. In some embodiments, on the horizontal plane (the normal direction of which is, for example, parallel to the third axis A3), the size of the light-transmitting portion 244 may be larger than the size of the first optical opening 216 and/or the second optical opening 217. In some embodiments, the shape of the light-transmitting portion 244 may be different from the shape of the first optical opening 216 and/or the second optical opening 217. However, the present disclosure is not limited thereto. As a result, single optical element 240 can be used to simultaneously open or close the first optical opening 216 and the second optical opening 217, thereby reducing the manufacturing cost of the optical element driving mechanism 200.

In addition, the optical element 240 includes two opposite extending portions 241 extending toward the base 220 along the third axis A3. In some embodiments, the extending portions 241 may be assembled to the body of the optical element 240 (that is, the part provided with the light-shielding portions 243 and the light-transmitting portion 244). However, the present disclosure is not limited thereto. In other embodiments, the extending portions 241 may be integrally formed with the body of the optical element 240. With the arrangement of the extending portions 241, the movable portion 230 and the optical element 240 can be connected on the side of the optical element driving mechanism 200, thereby reducing the size of the optical element driving mechanism 200 in the second axis A2, achieving the effect of miniaturization.

In some embodiments, the optical element driving mechanism 200 includes a linkage assembly 250. The linkage assembly 250 includes a linkage element 251 and an opening structure 252. For example, the linking element 251 is located on the movable portion 230 and has a protruding structure protruding toward the optical element 240. The opening structure 252 is located in the optical element 240 and corresponds to the linkage element 251. In some embodiments, the opening structure 252 may be located between the extending portions 241. In other words, the extension portions 241 may define the opening structure 252 corresponding to the linkage element 251. In this embodiment, the opening structure 252 is an open opening (for example, U-shaped). In this way, the linkage element 251 can be aligned with the opening structure 252 more easily, thereby reducing the manufacturing difficulty of the optical element driving mechanism 200. However, the present disclosure is not limited thereto. In some other embodiments, the opening structure 252 may be a closed opening (for example, in a shape of rectangular). In this way, the linkage element 251 can be coupled to the opening structure 252 more stably, thereby reducing the risk of failure of the optical element driving mechanism 200.

In addition, the optical element driving mechanism 200 includes a driving assembly 260. The driving assembly 260 includes a magnetic element 261, a coil 262 and a magnetically permeable element 263. In this embodiment, the magnetic element 261 is disposed in the movable portion 230, and the coil 262 surrounds the magnetically permeable element 263 and is disposed in the base 220. However, the present disclosure is not limited thereto. In some other embodiments, the magnetic element 261 may be disposed in the base 220, while the coil 262 and the magnetically permeable element 263 are disposed in the movable portion 230. In some embodiments, the linkage element 251 may correspond to magnetic element 261. For example, the linking element 251 may be located above the magnetic element 261, and in a vertical direction (for example, parallel to the third axis A3), the linking element 251 can overlap the magnetic element 261. In some embodiments, the magnetic element 261, the coil 262 and the magnetically permeable element 263 may be arranged in the second axis A2.

Specifically, the base 220 has a first groove 221 and a second groove 222 that are spaced apart from each other. In some embodiments, the first groove 221 can accommodate the coil 262 and the magnetically permeable element 263, and the second groove 222 can accommodate the movable portion 230 and the magnetic element 261. In addition, the base 220 also has receiving grooves 223 corresponding to the profile of the sidewalls 212 of the outer frame 210. In some embodiments, the sidewalls 212 of the outer frame 210 may be disposed in the receiving groove 223, thereby facilitating bonding the outer frame 210 to the base 220.

Figure 3:
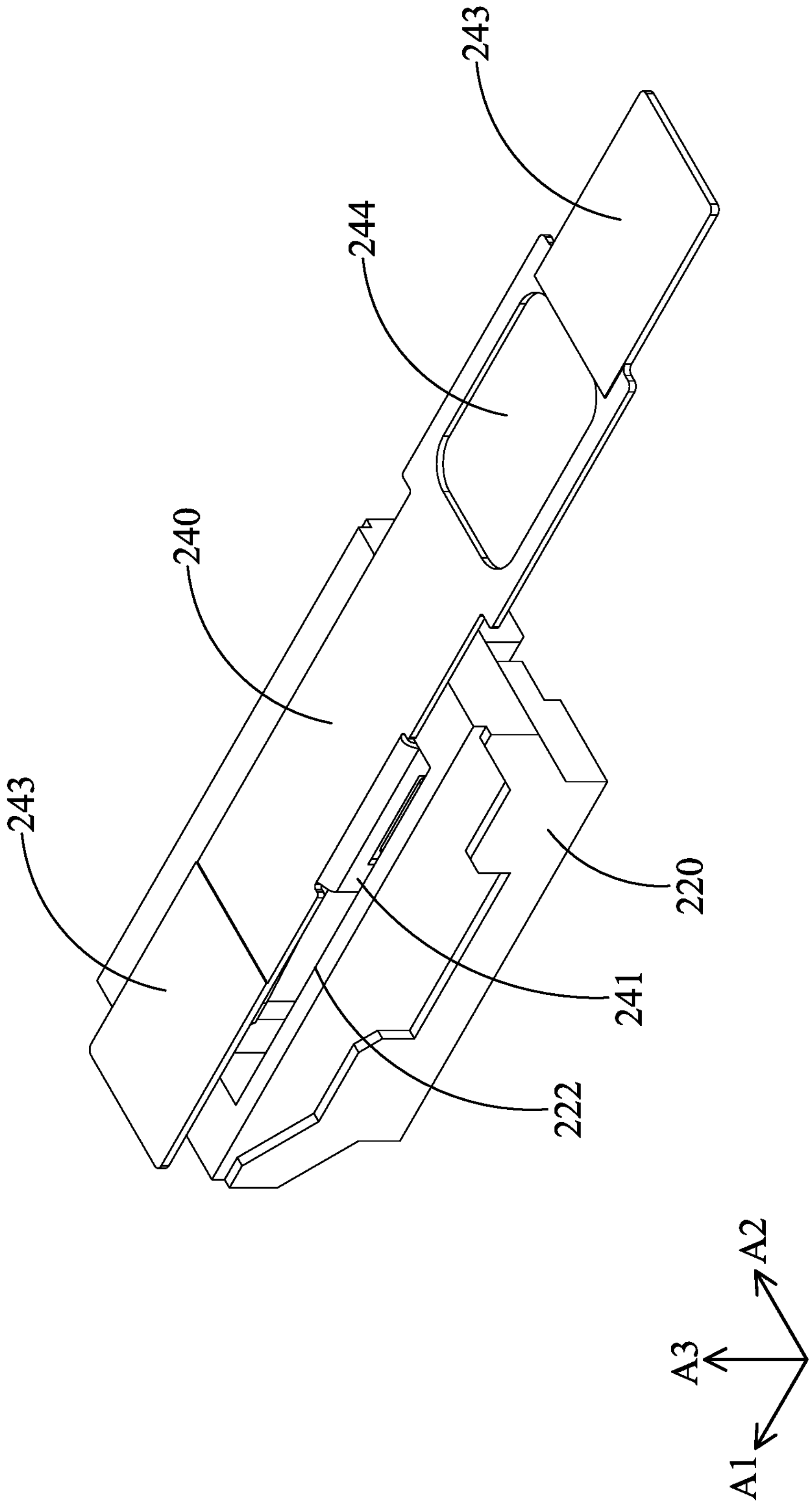
FIG. 3 shows a perspective view illustrating the interior structure of the optical element driving mechanism in accordance with some embodiment of the present disclosure.
Figure 4:
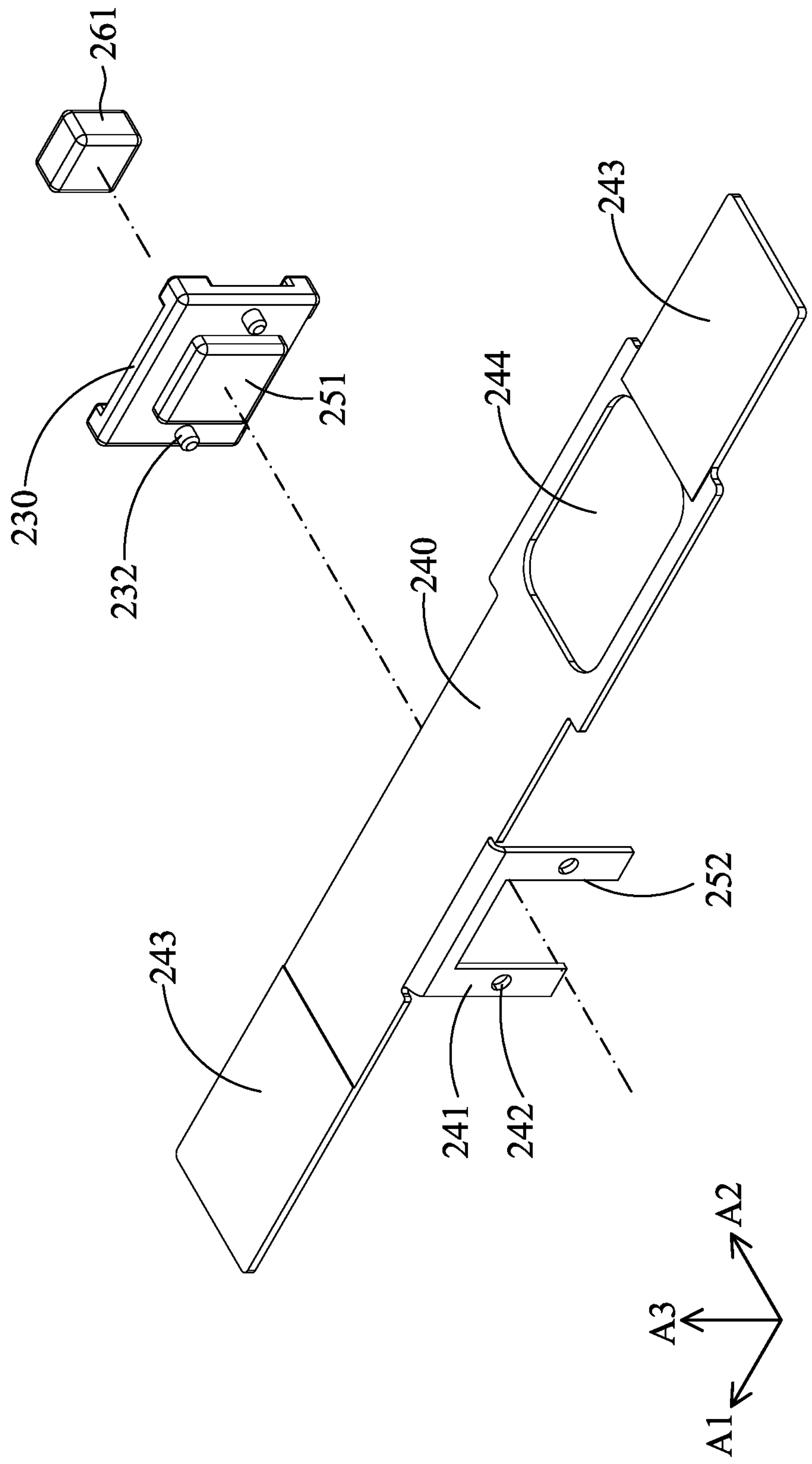
FIG. 4 shows an exploded view illustrating the optical element and the movable portion in accordance with some embodiment of the present disclosure.

FIG. 3 shows a perspective view illustrating the internal structure of the optical element driving mechanism 200 in accordance with some embodiments of the present disclosure. FIG. 4 illustrates an exploded view of the optical element 240 and the movable portion 230 in accordance with some embodiments of the present disclosure. As shown in FIGS. 3 and 4, the linking element 251 is inserted into the opening structure 252 of the optical element 240 in a direction that is parallel to the second axis A2, for example. In some embodiments, in the second axis A2, the linkage assembly 250 (including the linkage element 251 and the opening structure 252) at least partially overlaps the sidewalls 212 of the outer frame 210. In this way, the size of the optical element driving mechanism 200 in the second axis A2 can be reduced, thereby achieving miniaturization.

In addition, the movable portion 230 has positioning columns 232 that are located on opposite sides of the linkage element 251. The optical element 240 has positioning holes 242 corresponding to the positioning columns 232. In some embodiments, the positioning holes 242 may be formed on the extension portions 241. Specifically, when the linkage element 251 is inserted into the opening structure 252, the positioning columns 232 will be inserted into the corresponding positioning holes 242. In this way, the movable portion 230 can be stably connected to the optical element 240. In some embodiments, an adhesive (not shown) may be disposed between the movable portion 230 and the optical element 240 to bond the movable portion 230 and the optical element 240. However, the present disclosure is not limited thereto.

Figure 5:
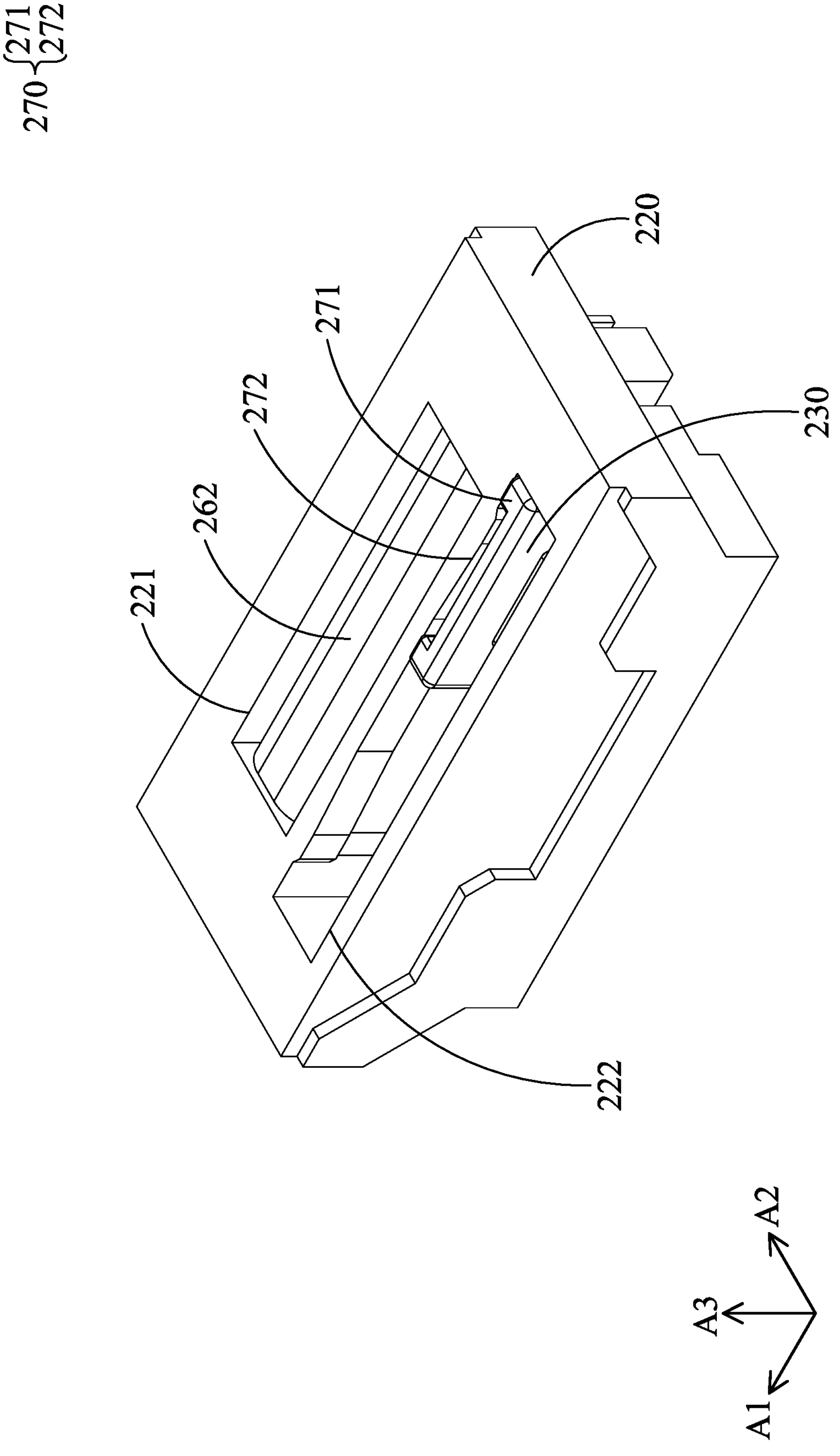
FIG. 5 shows a perspective view illustrating the base in accordance with some embodiment of the present disclosure.

FIG. 5 shows a perspective view illustrating the base 220 in accordance with some embodiments of the present disclosure. As shown in FIG. 5, the first groove 221 of the base 220 can accommodate the coil 262 (and the magnetically permeable element 263), and the second groove 222 can accommodate the movable portion 230 (and the magnetic element 261). In some embodiments, the top surface of the base 220 may cover the magnetically permeable element 263, that is, the magnetically permeable element 263 will not be exposed from the top surface of the base 220. In addition, the optical element driving mechanism 200 includes a guiding assembly 270, and the movable portion 230 is movable in the first axis A1 relative to the fixed portion F (such as the base 220) via the guiding assembly 270. For example, the guiding assembly 270 may include a first guiding assembly 271 and a second guiding assembly 272. In some embodiments, the first guiding assembly 271 may be disposed on the movable portion 230 and the second guiding assembly 272 may be disposed on the base 220, but the present disclosure is not limited thereto. In some embodiments, the second guiding assembly 272 contacts the first guiding assembly 271, and the first guiding assembly 271 is movable relative to the second guiding assembly 272. In some embodiments, the guiding assembly 270 may be located between the first groove 221 and the second groove 222 of the base 220. Specifically, the first groove 221 and the second groove 222 of the base 220 can be separated from each other via the second guiding assembly 272.

Figure 6A:
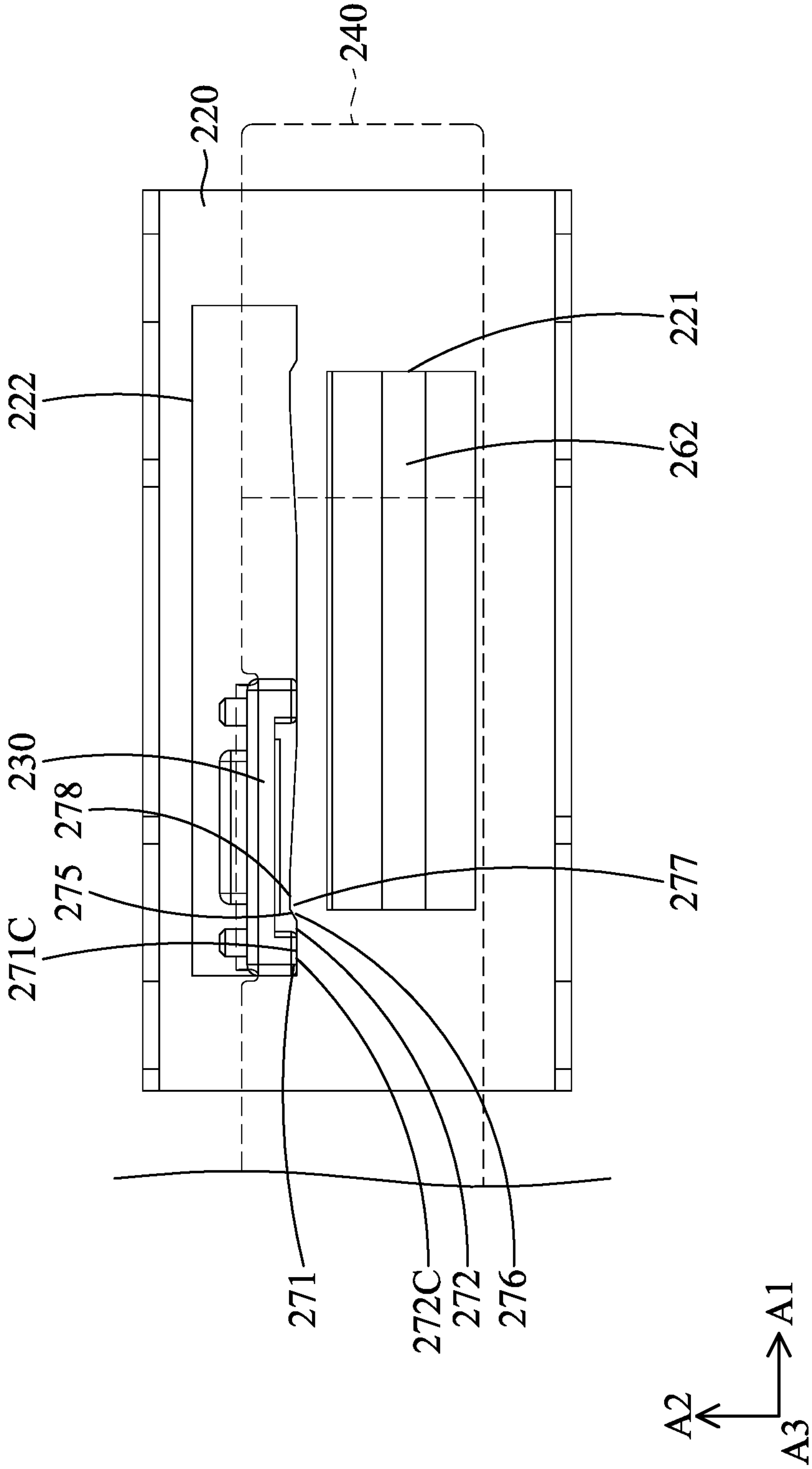
FIGS. 6A and 6B show top views illustrating the base and the movable portion in accordance with some embodiment of the present disclosure.
Figure 6B:
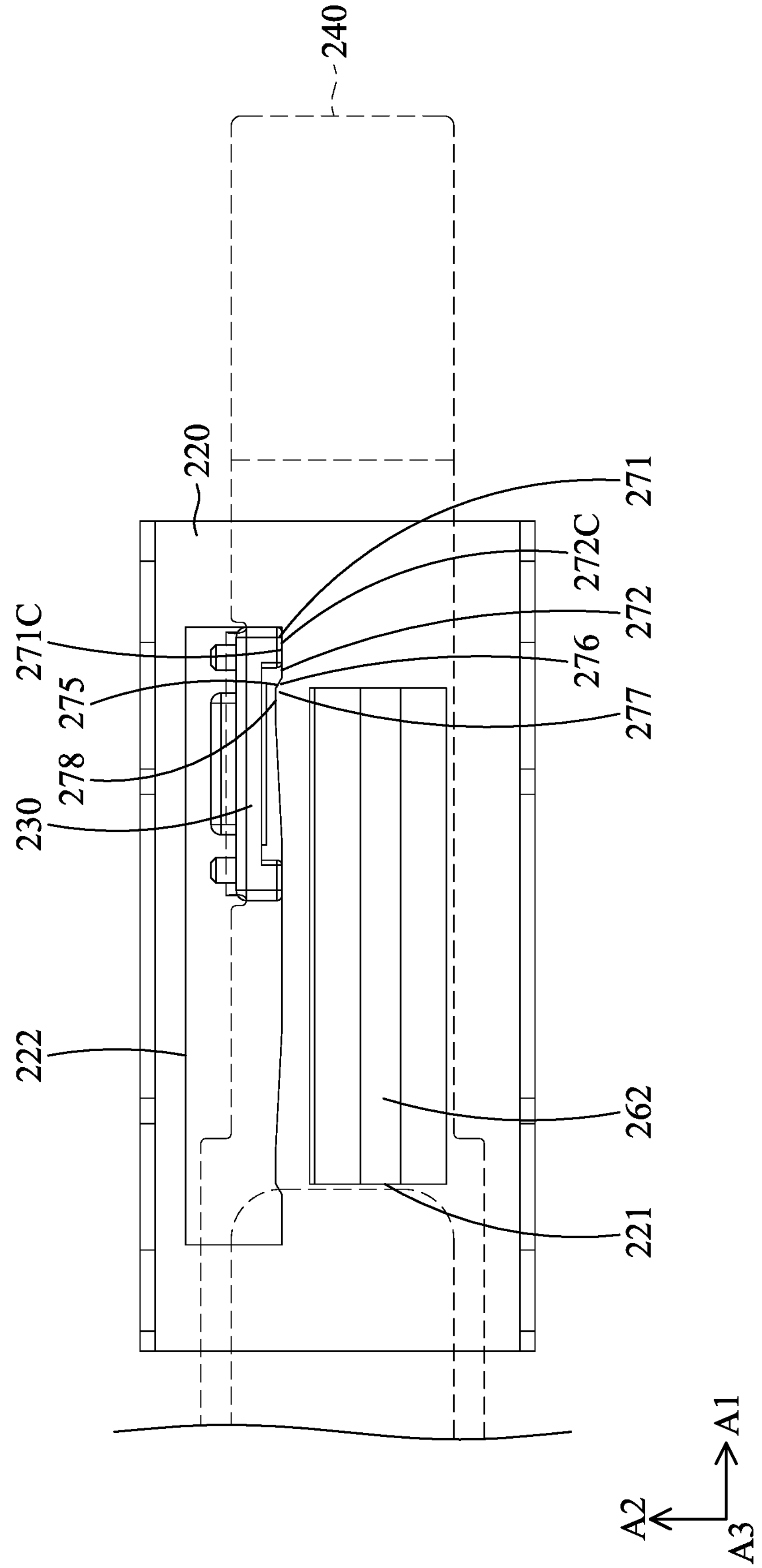

FIGS. 6A and 6B show top views illustrating the base 220 and the movable portion 230 in accordance with some embodiments of the present disclosure. As shown in FIGS. 6A and 6B, the first contact surface 271C of the first guiding assembly 271 contacts the second contact surface 272C of the second guiding assembly 272. In some embodiments, the second guiding assembly 272 further includes a first positioning portion 276 and a second positioning portion 277, and the first positioning portion 276 and the second positioning portion 277 can protrude from the second contact surface 272C (the normal direction thereof is, for example, parallel to the second axis A2) of the second guiding assembly 272 along the second axis A2, for example. The first positioning portion 276 has a first positioning surface 275 that faces the first guiding assembly 271 and is inclined relative to the second contact surface 272C. For example, the angle between the first positioning surface 275 and the second contact surface 272C may be between about 15 degrees and about 60 degrees (such as about 30 degrees, about 45 degrees, etc.), but the present disclosure is not limited thereto.

In addition, the second positioning portion 277 has a second positioning surface 278. The second positioning surface 278 faces the first guiding assembly 271 and is inclined relative to the second contact surface 272C. The second positioning surface 278 may be adjacent to the first positioning surface 275. Specifically, an interface may be formed between the second positioning surface 278 and the first positioning surface 275. In some embodiments, the second positioning surface 278 is not parallel and not perpendicular to the first positioning surface 275. In some embodiments, the angle between the first positioning surface 276 and the second contact surface 272C is different from the angle between the second positioning surface 278 and the second contact surface 272C. For example, the angle between the first positioning surface 276 and the second contact surface 272C is greater than the angle between the second positioning surface 278 and the second contact surface 272C. As set for above, the first positioning portion 276 and the second positioning portion 277 may form an asymmetric structure, in which the relatively inclined first positioning surface 275 is closer to the edge of the base 220 and the relatively flat second positioning surface 278 is closer to the center of the base 220. However, the present disclosure is not limited thereto.

In some embodiments, the magnetic element 261 disposed on the movable portion 230 can generate a magnetic attraction force with the magnetically permeable element 263 (for example, referring to FIG. 2), so that the movable portion 230 can rest on the base 220 and maintain at the desired location. When it is desired to move the optical element 240, electrical signals may be transmitted to the coil 262. At this time, the coil 262 and the magnetically permeable element 263 will generate a magnetic thrust corresponding to the magnetic element 261. In this way, the coil 262 and the magnetically permeable element 263 will generate a force that is substantially parallel to the first axis A1 to drive the movable portion 230 to move in the first axis A1. In summary, the driving assembly 260 (including the magnetic element 261, the coil 262 and the magnetically permeable element 263) can be used to drive the movable portion 230 to move in the first axis A1 relative to the fixed portion F (such as the outer frame 210 and the base 220). Accordingly, the optical element 240 is controlled to block or reveal the first optical opening 216 and the second optical opening 217 (for example, referring to FIG. 2).

As shown in FIG. 6A, at this time, the optical element 240 (shown by dotted lines in this embodiment) moves to the first position (for example, the light-shielding position). The first guiding assembly 271 is located on the second contact surface 272C. The arrangement of the first positioning portion 276 helps to keep the movable portion 230 and the optical element 240 in position when the movable portion 230 and the optical element 240 are not driven, thereby reducing the risk of failure to the optical element driving mechanism 200 due to external impact. In some embodiments, when the optical element 240 moves to the first position (for example, the light-shielding position), the first guiding assembly 271 can be located on the second contact surface 272C and abut against the first positioning portion 276.

Next, when the driving component 260 starts to drive the movable portion 230 to move in the first axis A1, the first guiding assembly 271 that is originally limited by the first positioning surface 275 will first move onto the second positioning surface 278 along the first positioning surface 275, and finally return to second contact surface 272C. At this time, as shown in FIG. 6B, the movable portion 230 is located at the second position (for example, the light-transmitting position), and the first guiding assembly 271 will be located on the second contact surface 272C (that is, in contact with the second contact surface 272C) and keep the movable portion 230 in position via the opposite first positioning portion 276, thereby reducing the risk of the optical element 240 being displaced and causing the optical element driving mechanism 200 to fail. It should be understood that since the second positioning surface 278 is relatively flat than the first positioning surface 275, it may facilitate the movement of the movable portion 230 via the first guiding assembly 271, thereby reducing the resistance to the movement of the movable portion 230.

Figure 7:
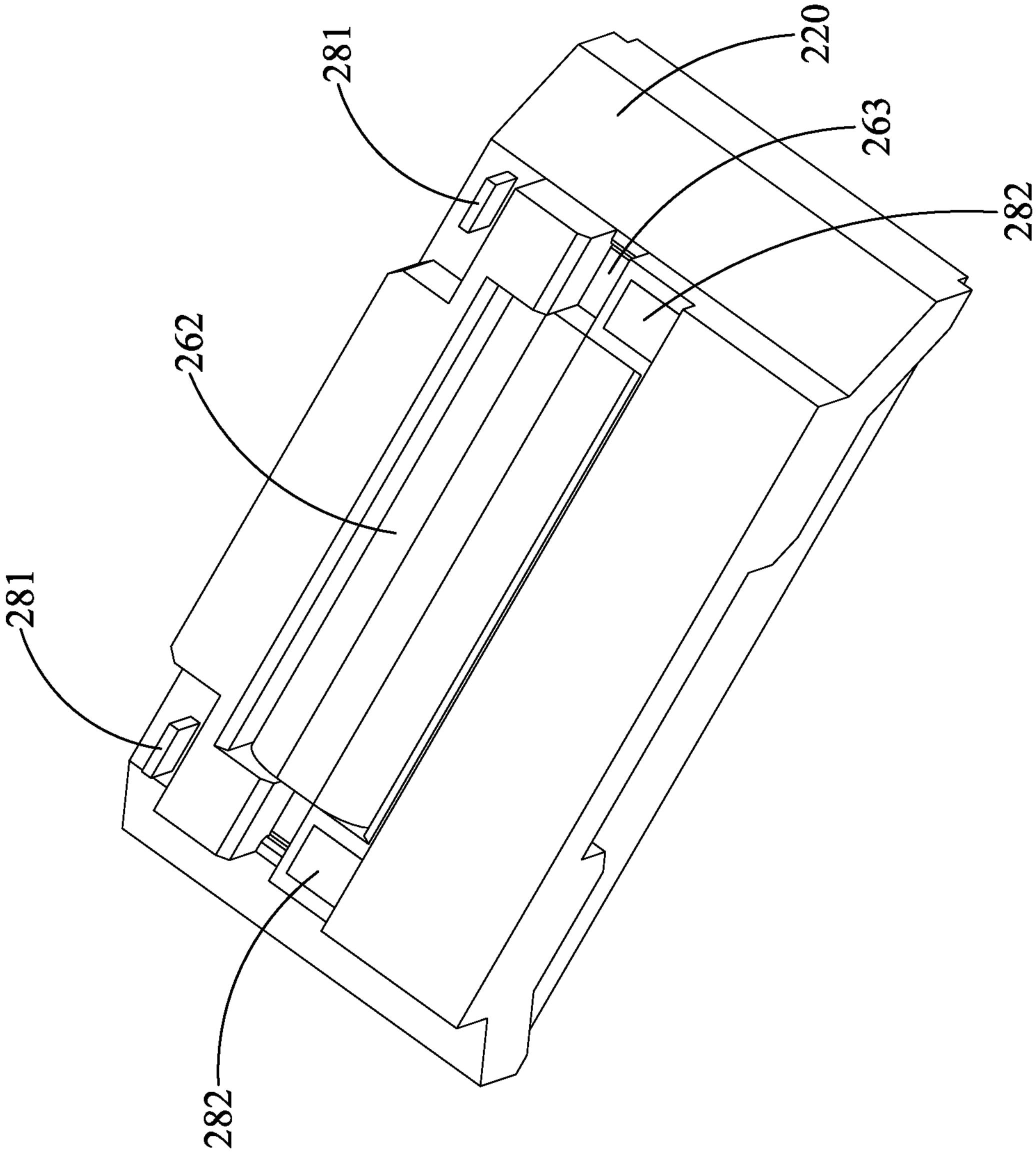
FIG. 7 shows a perspective view illustrating the base in accordance with some embodiment of the present disclosure.
Figure 7:
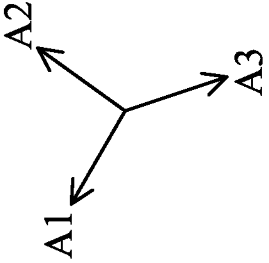
Figure 8:
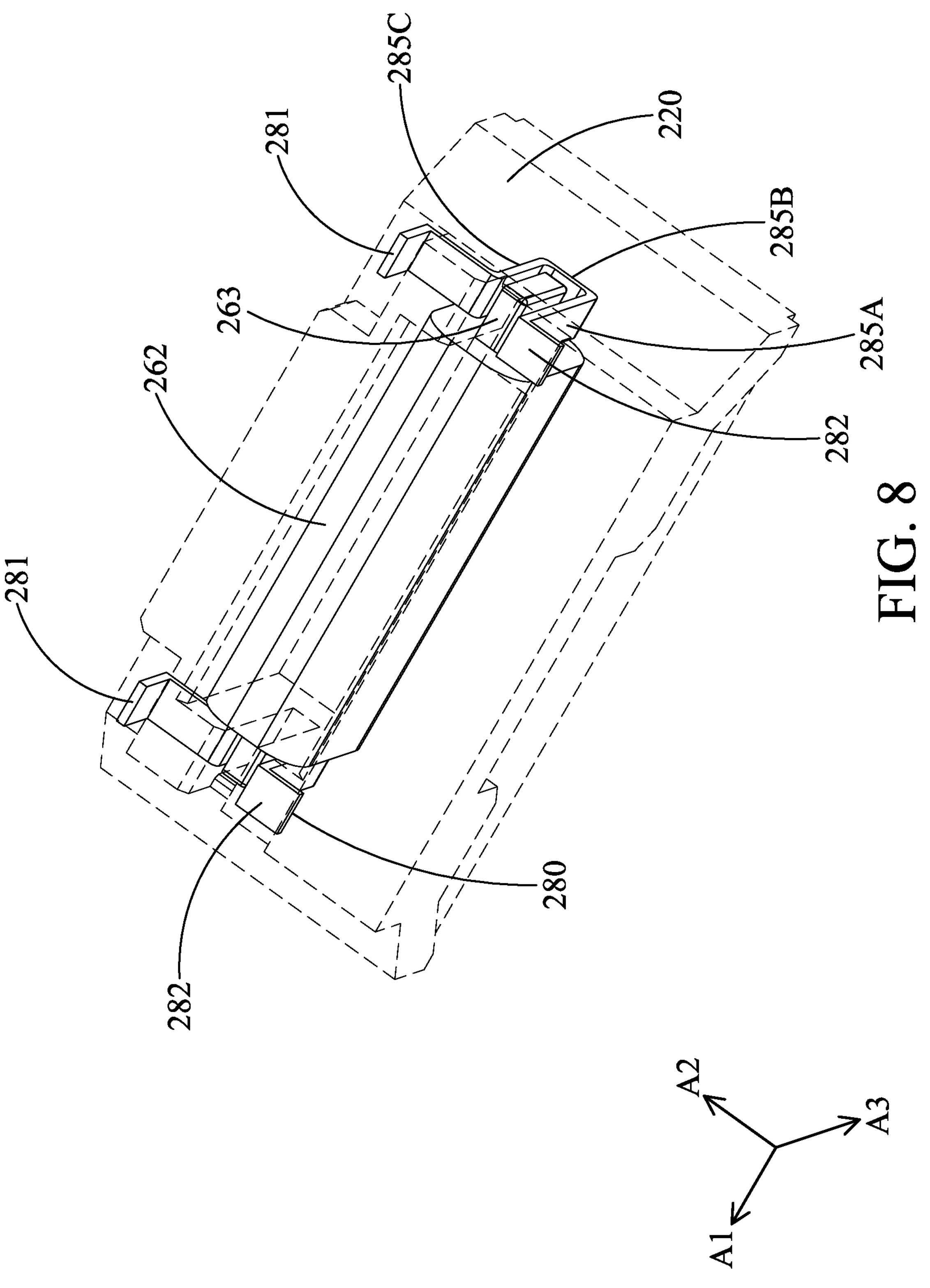
FIG. 8 shows a perspective view illustrating the base in accordance with some embodiment of the present disclosure.

FIGS. 7 and 8 show perspective views illustrating the base 220 in accordance with some embodiments of the present disclosure. As shown in FIGS. 7 and 8, in some embodiments, the coil 262 and the magnetically permeable element 263 can be installed below the base 220, that is, the coil 262 and the magnetically permeable element 263 are at least partially exposed from the bottom surface of the base 220. In addition, the optical element driving mechanism 200 includes a circuit assembly 280 to electrically connect the coil 262 with an external power source (not shown). In some embodiments, the circuit assembly 280 includes first contacts 281 and second contacts 282 located on opposite sides of the coil 262. However, the present disclosure is not limited thereto.

In addition, the circuit assembly 280 may include a plurality of segments 285A, 285B, and 285C, which are embedded in the base 220 and used to connect the first contacts 281 and the second contacts 282. Specifically, the aforementioned segments 285A, 285B and 285C may be connected to each other so that electrical signals can be transmitted between the first contacts 281 and the second contacts 282. In some embodiments, segments 285A, 285B, and 285C of circuit assembly 280 may surround magnetically permeable element 263. For example, the extending direction of the segment 285B may be substantially perpendicular to the extending direction of the segments 285A, and the extending direction of the segment 285C may be substantially parallel to the extending direction of the segment 285A. In some embodiments, in the third axis A3, the length of the segment 285A adjacent to the second contacts 282 may be slightly greater than the length of the segment 285C adjacent to the first contacts 281. In some embodiments, the circuit assembly 280 (such as the segments 285A, 285B, and 285C) at least partially overlaps the magnetically permeable element 263 in two axes that are respectively parallel to the second axis A2 and the third axis A3. With the segments 285A, 285B, and 285C embedded in the base 220, the structural strength of the optical element driving mechanism 200 can be improved. It should be understood that the configuration of the segments 285A, 285B and 285C shown in the present disclosure merely serves as an example and is not intended to limit the scope of the present disclosure.

Figure 9A:
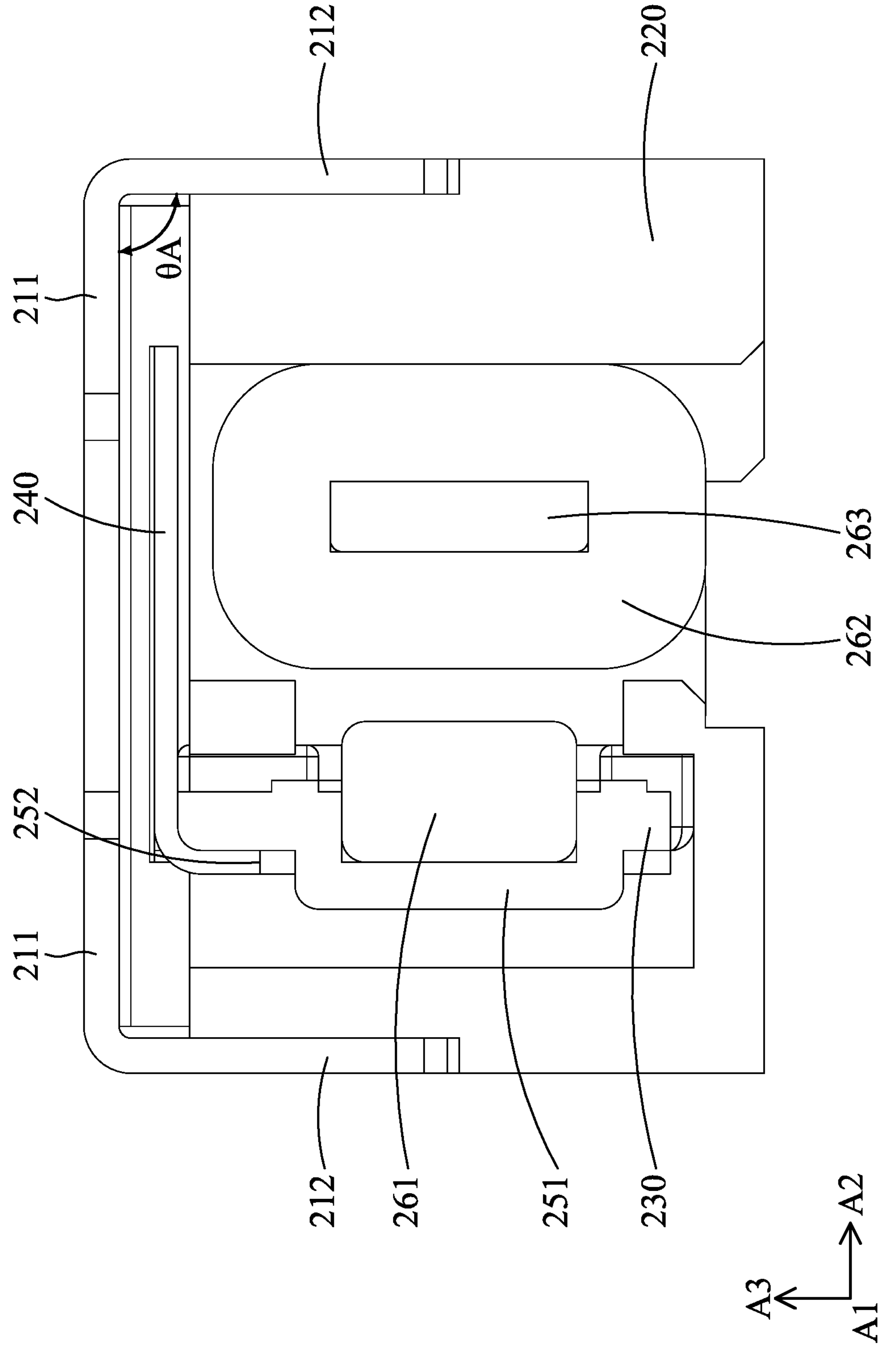
FIGS. 9A through 9C show cross-sectional views illustrating the optical element driving mechanism in accordance with some embodiment of the present disclosure.
Figure 9B:
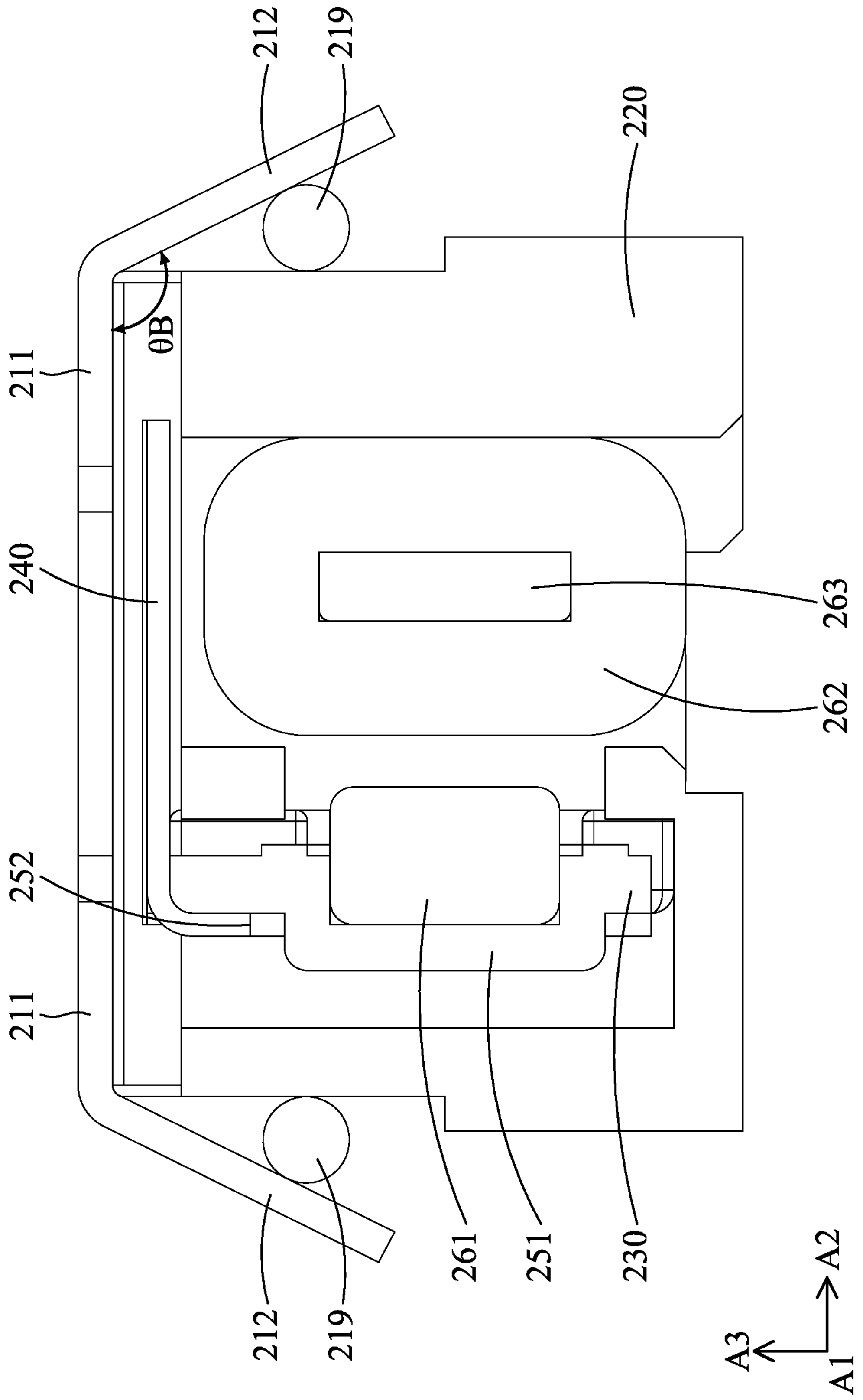
Figure 9C:
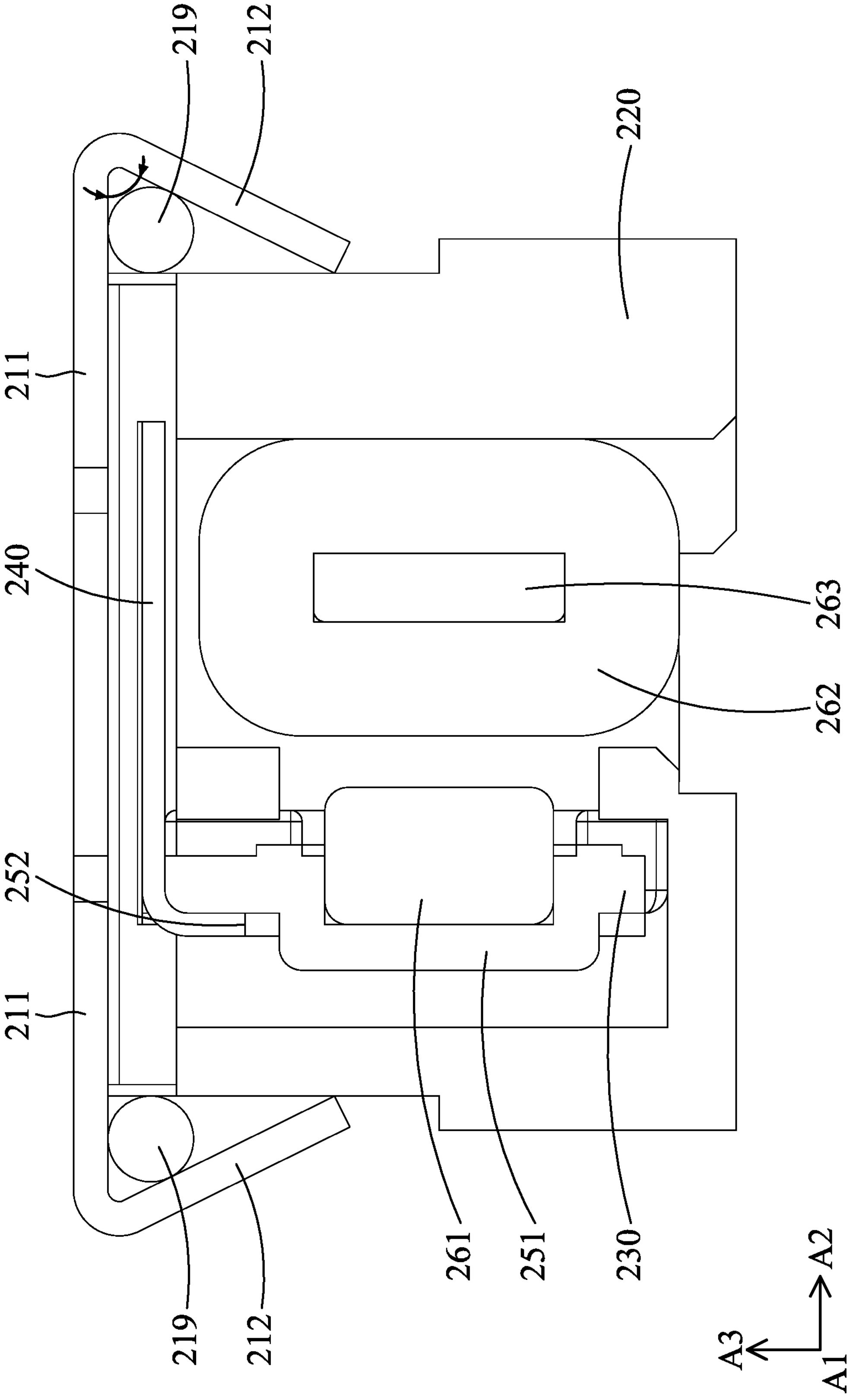

FIGS. 9A through 9C shows cross-sectional views illustrating the optical element driving mechanism 200 in accordance with some embodiments of the present disclosure. For example, FIGS. 9A through 9C can be drawn along the line D-D shown in FIG. 1, but the present disclosure is not limited thereto. As shown in FIG. 9A, in this embodiment, the top surface 211 of the outer frame 210 and the sidewalls 212 extending from the top surface 211 cover the movable portion 230 and the optical element 240 located inside the optical element driving mechanism 200. In this embodiment, the angle θA formed between the top surface 211 and the sidewalls 212 may be approximately 90 degrees. In other words, the top surface 211 may be substantially perpendicular to the sidewalls 212. In this way, the sidewalls 212 can be bonded to the base 220, thereby protecting the movable portion 230 and the optical element 240 inside the optical element driving mechanism 200.

As shown in FIG. 9B, in this embodiment, the angle θB formed between the top surface 211 and the sidewalls 212 may be greater than 90 degrees. In other words, an obtuse angle may be formed between the top surface 211 and the sidewalls 212. In some embodiments, an adhesive 219 may be disposed between the sidewalls 212 and the base 220 to bond the outer frame 210 and the base 220. However, the present disclosure is not limited thereto. Any material or structure that can bond the outer frame 210 and the base 220 is included within the scope of the present disclosure. With the above features, the difficulty of assembling the outer frame 210 and the base 220 can be reduced, thereby improving the manufacturing yield of the optical element driving mechanism 200.

As shown in FIG. 9C, in this embodiment, the top surface 211 can extend beyond the projected area of the base 220 on the horizontal plane (for example, perpendicular to the third axis A3), and the angle θC formed between the top surface 211 and the sidewalls 212 may be less than 90 degrees. In other words, an acute angle may be formed between the top surface 211 and the sidewalls 212. In some embodiments, the adhesive 219 may be disposed between the sidewalls 212 and the base 220 to bond the outer frame 210 and the base 220. However, the present disclosure is not limited thereto. In some embodiments, the adhesive 219 may be omitted. In addition, any material or structure that can bond the outer frame 210 and the base 220 is included within the scope of the present disclosure. With the above features, the joint strength of the outer frame 210 and the base 220 can be improved, thereby improving the structural strength of the optical element driving mechanism 200.

As set forth above, the present disclosure provides an optical element driving mechanism including a guiding assembly to move the movable portion relative to the fixed portion. With the arrangement of the guide assembly, the risk of displacement of the movable portion and the optical element while they are not driven can be reduced, thereby reducing the risk of failure of the optical element driving mechanism. In addition, extension portions are provided on the optical element, so that the movable portion and the optical element can be connected on the side of the optical element driving mechanism, thereby reducing the lateral size of the optical element driving mechanism and achieving miniaturization. Furthermore, a circuit assembly is embedded in the base, and includes a plurality of segments extending in different directions, thereby improving the structural strength of the optical element driving mechanism.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical element driving mechanism, comprising:
a movable portion used to connect an optical element;
a fixed portion, wherein the movable portion movable relative to the fixed portion;
a driving assembly used to drive the movable portion to move relative to the fixed portion in a first axis, wherein the driving assembly is arranged along a second axis, and the second axis is perpendicular to the first axis; and
a guiding assembly, wherein the movable portion is movable in the first axis relative to the fixed portion via the guiding assembly,
wherein the guiding assembly comprises:
a first guiding assembly; and
a second guiding assembly in contact with and movable relative to the first guiding assembly, wherein a first contact surface of the first guiding assembly contacts a second contact surface of the second guiding assembly,
wherein the second guiding assembly comprises:
a first positioning portion having a first positioning surface, wherein the first positioning surface faces the first guiding assembly, and an angle formed between the first positioning surface and the second contact surface is between 15 degrees and 60 degrees; and
a second positioning portion having a second positioning surface, wherein the second positioning surface faces the first guiding assembly, the second positioning surface is not parallel and not perpendicular to the first positioning surface.

2. The optical element driving mechanism as claimed in claim 1, wherein the second positioning surface is not parallel and not perpendicular to the second contact surface.

3. The optical element driving mechanism as claimed in claim 1, wherein the angle between the first positioning surface and the second contact surface is different from an angle between the second positioning surface and the second contact surface, and the angle between the first positioning surface and the second contact surface is greater than the angle between the second positioning surface and the second contact surface.

4. The optical element driving mechanism as claimed in claim 1, further comprising a linkage assembly, wherein when the movable portion moves relative to the fixed portion, the optical element is driven to move via the linkage assembly, and the optical element is movable relative to the movable portion.

5. The optical element driving mechanism as claimed in claim 4, wherein the linkage assembly includes:
a linkage element having a protruding structure; and
an opening structure corresponding to the linkage element.

6. The optical element driving mechanism as claimed in claim 4, wherein the linkage assembly overlaps a sidewall of the fixed portion in the second axis.

7. The optical element driving mechanism as claimed in claim 1, wherein the driving assembly comprises:
a magnetic element; and
a coil corresponding to the magnetic element, wherein the magnetic element is disposed on either of the movable portion and the fixed portion, and the coil is disposed on the other of the movable portion and the fixed portion.

8. The optical element driving mechanism as claimed in claim 7, wherein the driving assembly further comprises a magnetically permeable element used to generate a magnetic attraction force with the magnetic element, and the coil surrounds the magnetically permeable element.

9. The optical element driving mechanism as claimed in claim 8, wherein the magnetically permeable element is exposed from a bottom surface of the fixed portion, and a top surface of the fixed portion covers the magnetically permeable element.

10. The optical element driving mechanism as claimed in claim 7, wherein when the fixed portion comprises a base, the base has a first groove and a second groove separated from each other, the coil is disposed in the first groove, and the magnetic element is disposed in the second groove.

11. The optical element driving mechanism as claimed in claim 1, further comprises a circuit assembly electrically connected to the driving assembly, wherein the circuit assembly comprises a first contact and a second contact, and the first contact and the second contact are respectively located on opposite sides of a coil of the driving assembly.

12. The optical element driving mechanism as claimed in claim 11, wherein the circuit assembly includes a plurality of segments embedded in the fixed portion, and the segments extend in different directions.

13. The optical element driving mechanism as claimed in claim 12, wherein the segments comprise a first segment adjacent to the first contact and a second segment adjacent to the second contact, and in a third axis perpendicular to the first axis and the second axis, a length of the second segment is greater than a length of the first segment.

14. The optical element driving mechanism as claimed in claim 1, wherein the fixed portion comprises an outer frame, the outer frame has a top surface and a sidewall extending from the top surface, and the sidewall is not parallel to the top surface.

15. The optical element driving mechanism as claimed in claim 14, wherein an angle between the sidewall and the top surface is less than 90 degrees.

16. The optical element driving mechanism as claimed in claim 14, wherein the fixed portion comprises a base, and the base has a receiving groove corresponding to a profile of the sidewall of the outer frame.

17. An optical element driving mechanism comprising:
a movable portion used to connect an optical element;
a fixed portion, wherein the movable portion movable relative to the fixed portion;
a driving assembly used to drive the movable portion to move relative to the fixed portion in a first axis, wherein the driving assembly is arranged along a second axis, and the second axis is perpendicular to the first axis,
wherein the driving assembly comprises:
a magnetic element; and
a coil corresponding to the magnetic element, wherein the magnetic element is disposed on either of the movable portion and the fixed portion, and the coil is disposed on the other of the movable portion and the fixed portion,
wherein when the fixed portion comprises a base, the base has a first groove and a second groove separated from each other, the coil is disposed in the first groove, and the magnetic element is disposed in the second groove; and a guiding assembly, wherein the movable portion is movable in the first axis relative to the fixed portion via the guiding assembly, and the guiding assembly is located between the first groove and the second groove.

* * * * *